US012692010B2

(12) United States Patent
Labarthe et al.

(10) Patent No.: US 12,692,010 B2
(45) Date of Patent: Jul. 28, 2026

(54) METHOD FOR MOUNTING A HYDROGEN BOX IN A NACELLE FOR A HYDROGEN-POWERED AIRCRAFT

(71) Applicant: Airbus Operations SAS, Toulouse (FR)

(72) Inventors: Christophe Labarthe, Toulouse (FR); Lionel Czapla, Toulouse (FR); Flavio Bambina, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 19/191,310

(22) Filed: Apr. 28, 2025

(65) Prior Publication Data

US 2025/0333185 A1     Oct. 30, 2025

(30) Foreign Application Priority Data

Apr. 30, 2024    (FR) ....................................... 2404492

(51) Int. Cl.
B64D 37/30          (2006.01)
(52) U.S. Cl.
CPC ................................... B64D 37/30 (2013.01)
(58) Field of Classification Search
CPC ............ B64D 37/30; B64D 37/04; B64C 7/02
See application file for complete search history.

(56) References Cited

U.S. PATENT DOCUMENTS

| | | | |
|---|---|---|---|
| 3,432,911 A | 3/1969 | Rodgers | |
| 4,130,258 A | 12/1978 | Fox | |
| 9,885,436 B2 * | 2/2018 | Courpet | F16L 39/005 |
| 11,441,482 B2 * | 9/2022 | Lacko | F02C 7/042 |
| 11,958,625 B1 * | 4/2024 | DeVault | B64D 1/02 |
| 2022/0306306 A1 * | 9/2022 | Labarthe | F04D 25/0606 |
| 2022/0371743 A1 * | 11/2022 | Allain | B64D 37/04 |
| 2023/0036429 A1 * | 2/2023 | Guilloteau | F17C 13/084 |
| 2023/0356926 A1 * | 11/2023 | Foix | B64D 37/04 |
| 2024/0052976 A1 * | 2/2024 | Stautner | F17C 3/08 |

FOREIGN PATENT DOCUMENTS

CN          217598846 U     10/2022

OTHER PUBLICATIONS

French Search Report for corresponding French Patent Application No. 2404492 dated Oct. 18, 2024.

* cited by examiner

*Primary Examiner* — Joshua J Michener
*Assistant Examiner* — Ryan Andrew Yankey
(74) *Attorney, Agent, or Firm* — Greer, Burns & Crain, Ltd.

(57)          ABSTRACT
a method for mounting, in a nacelle for a hydrogen-powered aircraft, a box containing at least part of the equipment necessary for transporting dihydrogen to an engine of the aircraft, called H2 box, the mounting method comprising a step of positioning the H2 box in the nacelle by virtue of at least one rail secured to a chassis of the nacelle, or to the H2 box, or both.

11 Claims, 5 Drawing Sheets

100

-102-

-104-105-    -103-

-101-

-106-

-107-

-108-

METHOD FOR MOUNTING A HYDROGEN BOX IN A NACELLE FOR A HYDROGEN-POWERED AIRCRAFT

CROSS-REFERENCES TO RELATED APPLICATIONS

This application claims the benefit of French Patent Application Number FR2404492 filed on Apr. 30, 2024, the entire disclosure of which is incorporated herein by way of reference.

FIELD OF THE INVENTION

The present invention relates to a method for mounting, in a nacelle for a hydrogen-powered aircraft, a box comprising at least part of the equipment necessary for transporting dihydrogen to the engine of the aircraft, called hydrogen (H2) box.

BACKGROUND OF THE INVENTION

To reduce the climate impact of aviation, the Applicant has developed aircraft designs with hydrogen-powered engines.

Powering engines with hydrogen requires specific equipment, at least some elements of which are positioned in a box, called hydrogen (H2) box, installed in the nacelle of the aircraft.

However, such an H2 box is heavy and bulky and as a result it has proved to be very awkward to fit the H2 box in the nacelle, especially because the nacelle itself is congested and does not provide much space.

The aim of the invention is to at least partially overcome these drawbacks.

SUMMARY OF THE INVENTION

To this end, the invention proposes a method for mounting, in a nacelle for a hydrogen-powered aircraft, a box containing at least part of the equipment necessary for transporting dihydrogen to an engine of the aircraft, called H2 box, the mounting method comprising a step of positioning the box in the nacelle by virtue of at least one rail secured to a chassis of the nacelle and/or to the H2 box.

As a result, the method according to the present invention allows an operator to install the H2 box in the nacelle, in spite of its weight and bulk, while moreover not adding further mass to the aircraft, since the rail can be removed once the box is installed.

With preference, each rail is removably mounted on the chassis of the nacelle and/or on the H2 box.

According to another aspect, the method comprises a step of positioning the rail with respect to the chassis in an installation position of the H2 box.

According to another aspect, the step of positioning the rail comprises a step of immobilizing the rail in the installation position of the H2 box.

According to another aspect, the step of positioning the rail comprises a step of positioning a mounting interface between the chassis and said at least one rail.

According to another aspect, during the step of positioning the rail with respect to the chassis, the rail is screwed to the chassis via the mounting interface.

According to another aspect, during the step of positioning the rail with respect to the chassis, the rail is moved into the nacelle while being guided by at least one guide roller of the mounting interface.

According to another aspect the step of positioning the H2 box in the nacelle comprises a step of guiding the box along the rail via at least one guide roller.

According to another aspect, the method comprises a step of fixing the box in the nacelle and then a step of removing the rail from the nacelle.

The invention also relates to an intermediate structure for the mounting method as described above, comprising the nacelle, the H2 box, and the mounting interface, the mounting interface being on one side fixed to the chassis and on the other side fixed to said rail.

The invention also relates to an intermediate structure for the mounting method as described above, comprising the nacelle, the H2 box, and the mounting interface, the mounting interface comprising a plate for fixing the interface to the chassis, a support for at least one guide roller, and said at least one guide roller.

BRIEF DESCRIPTION OF THE DRAWINGS

Further features, details and advantages will become apparent on reading the detailed description below, and on studying the attached drawings, in which.

DETAILED DESCRIPTION OF THE PREFERRED EMBODIMENTS

The examples and the related conditions detailed here are mainly intended to help the reader understand the principles of the present invention and not to limit its scope to these specific examples and conditions. It will be understood that a person of ordinary skill in the art can conceive of various arrangements which, although not explicitly described or represented here, nevertheless embody the principles of the present invention and are included in its spirit and scope.

Furthermore, to facilitate understanding, the following description may describe relatively simplified implementations of the present invention. As a person of ordinary skill in the art will understand, other implementations of the present invention may be of greater complexity.

In some cases, examples of modifications of the present invention may also be presented. This is done simply as an aid to understanding, and again not to define the scope or establish the limits of the present invention. These modifications are not an exhaustive list, and a person of ordinary skill in the art may make other modifications while still remaining within the scope of the present invention.

Furthermore, all the statements below relating to the principles, aspects and implementations of the present invention, as well as the specific examples thereof, aim to encompass both the structural and functional equivalents thereof, whether they are currently known or developed in the future.

The figures show a non-limiting orthogonal frame of reference (X, Y, Z) to simplify the description. The direction X corresponds for example to a longitudinal direction (roll axis) of an aircraft, the direction Y corresponds to a transverse direction (pitch axis) and the direction Z corresponds to a vertical direction when the aircraft is on the ground (yaw axis).

As can be seen in the figures, the invention relates to a method 100 for mounting a box, called H2 box, in a nacelle, for a hydrogen-powered aircraft. In the figures, the nacelle is given the reference sign 1 and the box the reference sign 2.

Figure 3:
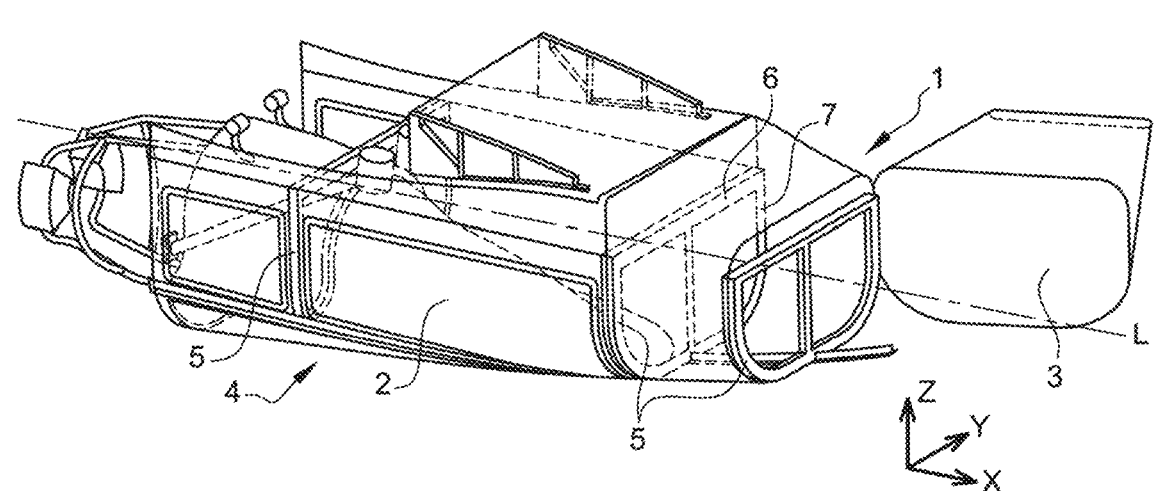
FIG. 3 is a perspective view of the nacelle in FIG. 2, an access point having been opened up to allow passage of the H2 box.

The nacelle 1 has a rear cone 3 which can be detached or at the very least moved between a position in which it closes the nacelle 1 (FIG. 2) and a position in which it opens up the nacelle 1 (FIG. 3). L denotes a longitudinal axis of the nacelle 1, which advantageously extends in the direction X.

As can be seen in the figures by transparency, the nacelle 1 has a chassis 4 which comprises a set of structural elements 5. Each of these elements 5 has a rectilinear portion 6 extending parallel to the axis Y and a curved portion 7, so as to have the overall shape of a D. Each element has an opening formed by the portions 6 and 7, thereby making it possible to receive the box 2 in the nacelle 1.

The box 2 contains at least part, and preferably all, of the equipment (pump, heat exchangers) necessary for transporting hydrogen to the engine of the aircraft. Non-limitingly, the box 2 has, in the embodiments illustrated, an elongate, substantially cylindrical shape of longitudinal axis A. The longitudinal axis A of the box 2 is advantageously parallel to the direction X. Means for fixing the box 2 in the nacelle 1 will be described in detail later on.

Figures 1, 2:
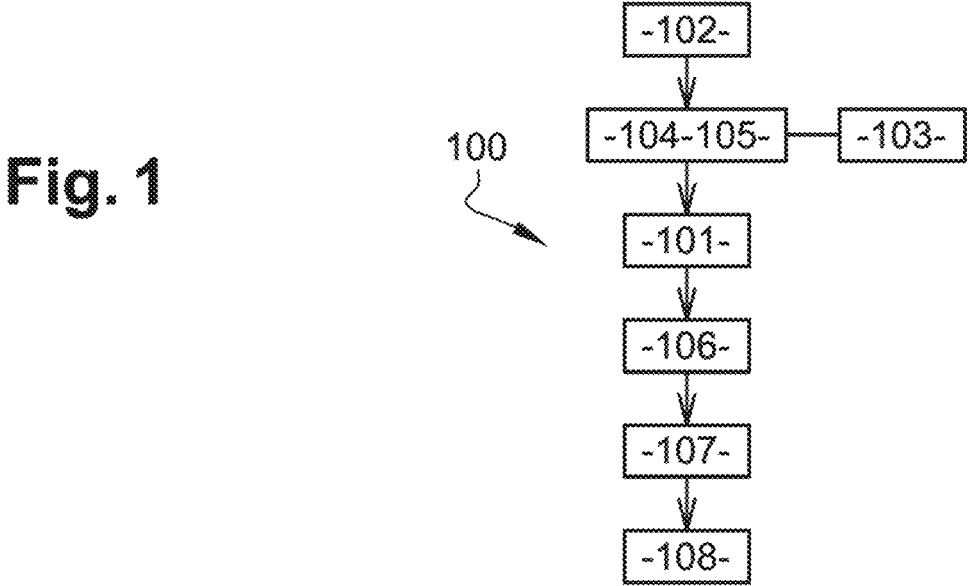
FIG. 1 is a diagram illustrating the sequence of a method according to the present invention for mounting a box, called H2 box, in a nacelle for an aircraft to power it.
FIG. 2 is a perspective view of an aircraft nacelle intended to receive an H2 box, in an initial position.

As FIG. 1 particularly clearly shows, the method 100 comprises a step 101 of positioning the box 2 in the nacelle 1 by virtue of at least one rail 10 secured to a chassis of the nacelle 1 and/or to the H2 box 2.

In the following text, the final position of the box 2 in the nacelle 1 will be called the installation position of the box 2.

In the embodiments illustrated, two rails 10 are mounted. However, the invention is not limited to this number and, depending on the shape and weight of the box 2 and on the space taken up inside the nacelle 1, the method 100 provides mounting less, or conversely more, rails 10.

With preference, each rail 10 is removably mounted and intended to be taken out of the nacelle 1 once the box 2 has been fitted, as will be explained.

Advantageously, each rail 10 extends longitudinally parallel to the longitudinal axis L of the nacelle 1 between an end 10-1, intended to be disposed in the nacelle 1, and an end 10-2, intended to be disposed outside the nacelle 1.

Figure 7:
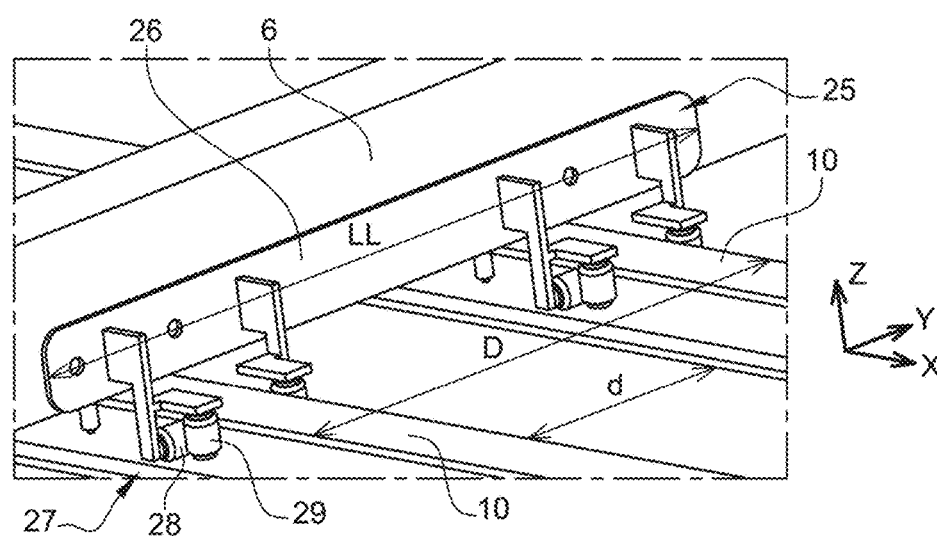
FIG. 7 is a detail view of the nacelle in FIG. 4, according to a second embodiment of the invention.

In the embodiments illustrated, the rails 10 are elongate parts, the inner edges of the two rails 10 facing one another at a distance denoted d, whereas outer edges of the two rails 10 are separated by a length D (FIG. 7).

As FIG. 1 shows, the method 100 comprises a prior step 102 of preparing the nacelle 1. During this step, the rear cone 3 is moved in such a way as to open up the nacelle 1 to allow the rails 10 and the box 2 to pass.

As FIG. 1 also shows, the method 100 comprises a step 103 of positioning each rail 10 with respect to the chassis in the installation position of the box.

The step 103 advantageously comprises a step 104 of positioning a mounting interface, denoted IM, between the chassis 4 and one of the rails 10, this interface being described in detail later on.

According to a first embodiment, during the step 103 of positioning the rail with respect to the chassis, the rail is screwed to the chassis via the mounting interface, as will be described in detail later on with reference more particularly to FIGS. 4 and 5.

According to a second and a third embodiment, during the step 103 of positioning the rail with respect to the chassis, the rails 10 are moved into the nacelle 1 while being guided by at least one guide roller for guiding the mounting interface, as will also be described in detail later on with reference more particularly to FIGS. 7, 9 and 10.

As FIG. 1 shows, the positioning step 103 comprises a step 105 of immobilizing each rail 10 in the installation position of the box 2.

It will be noted that the step 101 of positioning the box 2 in the nacelle 1 comprises a step of fixing the box 2 to the rails (third embodiment) or, alternatively, guiding the box along the rail by means of at least one guide roller (first and second embodiments).

As illustrated in FIG. 1, the method 100 also comprises a step 106 of fixing the box 2 in the nacelle, in its installation position, and then a step 107 of removing the rails 10 and lastly a step 108 of closing the nacelle 1 by replacing the rear cone 3.

A detailed description will now be given of the mounting method 100 according to a first embodiment, in relation to FIGS. 4, 5 and 6.

According to this embodiment, the rails 10 are fixed to the chassis 4 via a set of mounting interfaces IM called joining interfaces and given the reference sign 11.

Figure 4:
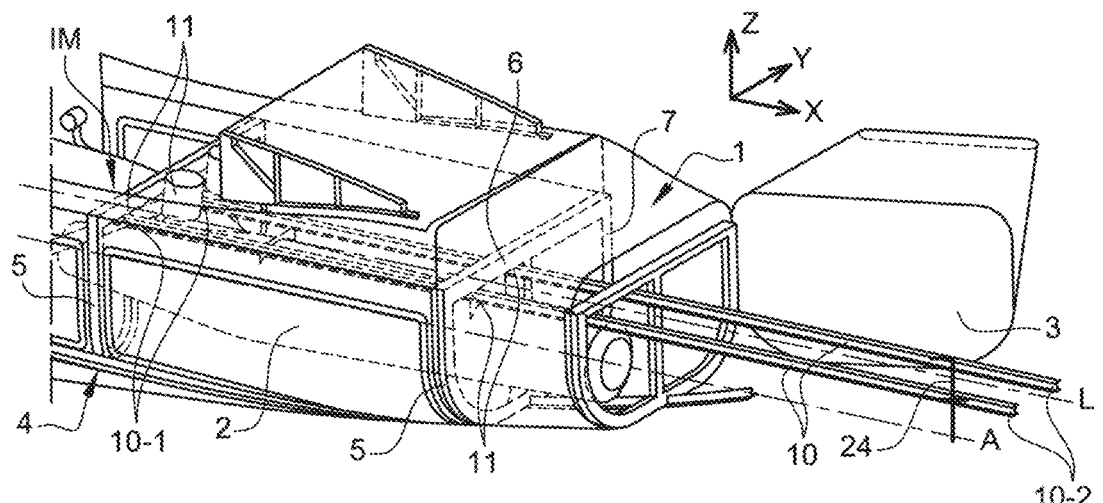
FIG. 4 is a perspective view of the nacelle in FIG. 3, rails having been secured to a chassis of the nacelle for installing an H2 box, according to one embodiment of the invention.

As FIG. 4 shows, each rail 10 is secured to two structural elements 5 via a respective joining interface 11. The embodiment illustrated makes use of four joining interfaces 11. Of course, the invention is not limited to this configuration, and the number of interfaces 11 depends in particular on the weight and the geometry of the box 2.

Figures 5, 6:
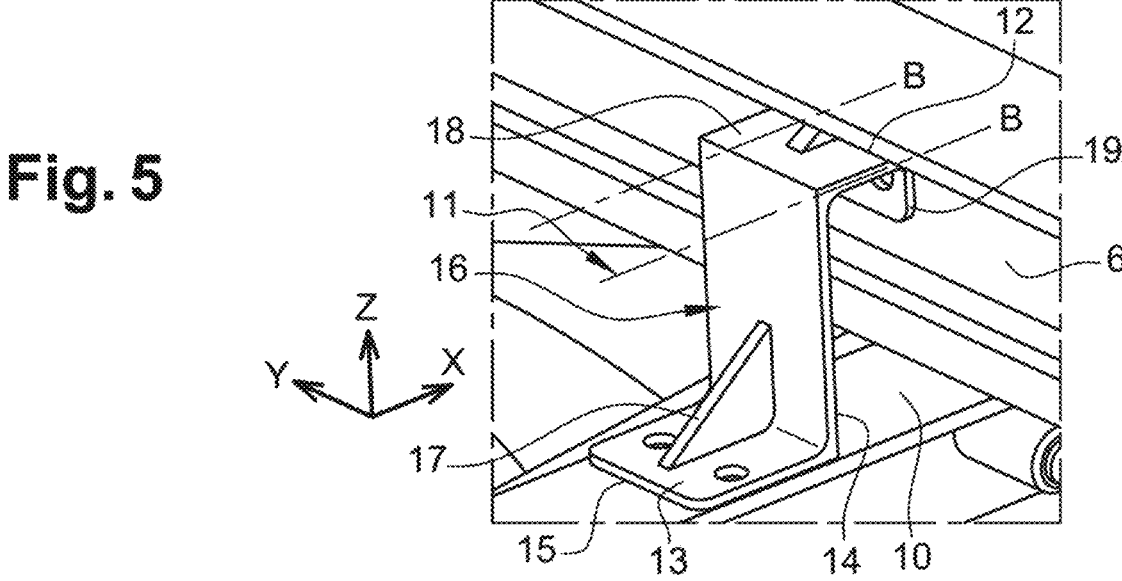
FIG. 5 is a detail view of the nacelle in FIG. 4.
FIG. 6 is another detail view of the nacelle in FIG. 4.

As FIG. 5 particularly clearly shows, each joining interface 11 comprises a first end 12 secured to the rectilinear portion 6, an end 13 secured to the rail 10 and an intermediate part 14 disposed between the end 12 and the end 13.

The end 13 comprises a plate 15 provided with orifices for screwing the end 13 to the rail 10. As illustrated in FIG. 5, the plate 15 is laid on the rail 10 during step 104.

The intermediate part 14 continues the end 13 by way of a plate 16 which extends in a plane (Y, Z) and is orthogonal to the plate 15 of the end 13. A reinforcing bracket 17 is advantageously disposed between the plate 15 and one part of the plate 16.

The part 14 comprises a plate 18 which extends in a plane (X, Y), in the continuation of the plate 16, and is continued by a plate 19 projecting from the plate 18 and extending in a plane (Y, Z). The plate 19 forms the end 12.

As illustrated in FIG. 5, the plate 19 is laid against the rectilinear portion 6 during step 104. The plate 19 is provided with orifices for screwing the interface 11 to the structural element 5 (bolts given the reference sign B in FIG. 5).

According to this first embodiment, during step 103, the rails 10 are placed in the nacelle 1 by screwing the joining interfaces 11 to the rails 10 and possibly to the chassis 4. At the end of this step, the rails 10 extend in the openings of the structural elements 5 from the end 10-1 inside the nacelle 1 as far as the free end 10-2 outside the nacelle 1. Then, the H2 box is placed, as will now be explained.

With preference, the box 2 is provided with a set 20 of at least one guide roller for guiding the box 2 along each rail 10.

In FIG. 6, the box 2 is provided with two pairs of guide rollers 20 (only one pair being visible), and each pair translationally moves the box 2 along a respective rail. The pairs are disposed facing one another.

Each pair of guide rollers 20 comprises a first guide wheel 21, the axis of rotation of which extends along the direction Y, and a second guide wheel 22, the axis of rotation of which extends along the direction Z.

It will be noted that, advantageously, each rail 10 is provided with an end-of-travel element 23 for stopping the movement of the box 2 along the rail 10 in the installation position of the box 2 in the nacelle 1.

Thus, during step 101, the box 2 is positioned at the free end 10-2 of the rail 10 and then the box 2 is slid beneath the rail 10, the guide wheels 21, 22 rotating about their respective axis, as far as the end-of-travel stop 23.

It will be noted that, advantageously, each rail 10 is provided with a locking pin 24 in the vicinity of the free end 10-2 to prevent the box 2 from sliding out of the rail 10 while the box 2 is not fixed in its installation position.

Figure 8:
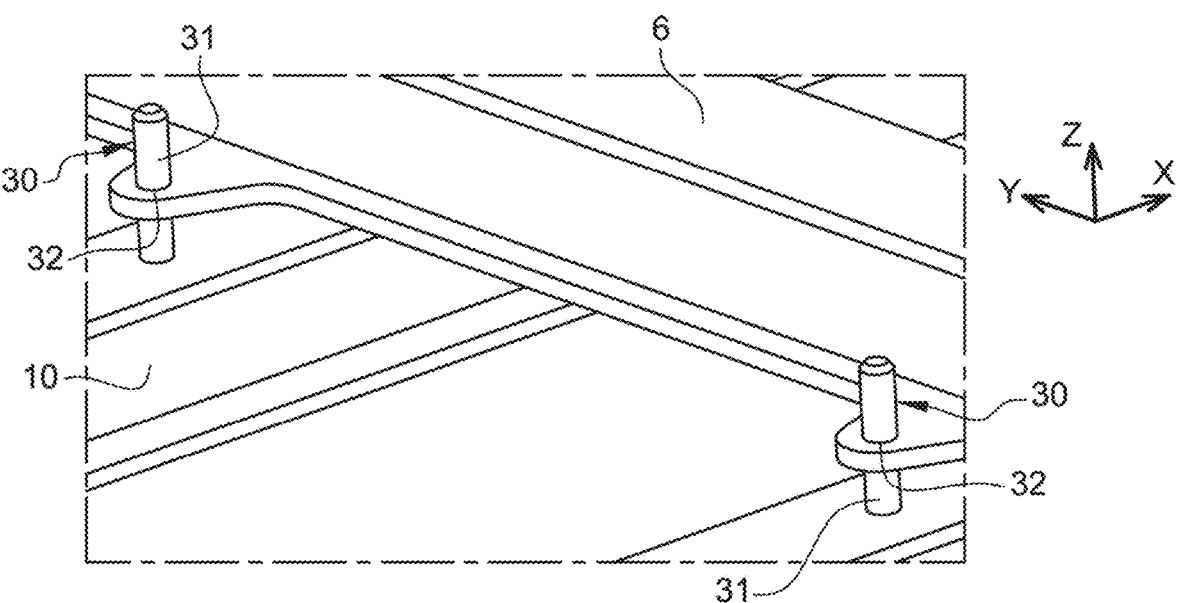
FIG. 8 is another detail view of the nacelle in FIG. 7.

A second embodiment, illustrated in FIGS. 6, 7 and 8, will now be described in detail.

According to this embodiment, the rails 10 are fixed to the chassis 4 via a set of at least one mounting interface IM, given the reference sign 25 in FIG. 7. In the embodiment illustrated, two interfaces 25 are enough, although this number of course is not limiting.

As illustrated in FIG. 7, the mounting interface 25 comprises a plate 26 for securing the interface to the rectilinear portion 6 of the structural element 5. The plate 26 extends in a plane (Y, Z) and has a length denoted LL. With preference, the length LL is greater than the distance D between the two rails 10, thereby ensuring that a single plate 26 connects both of the rails 10.

Of course, the invention is not limited to this configuration and it is possible to envisage associating a respective dedicated plate 26 with just one rail 10.

The mounting interface 25 comprises a set 27 of at least one guide roller for guiding the rail 10 in the nacelle 1. In the embodiment illustrated, the interface 25 comprises two pairs of wheels for guiding one of the rails. Each pair comprises a first guide wheel 28, the axis of rotation of which extends along the direction Y, and a second guide wheel 29, the axis of rotation of which extends along the direction Z. The mounting interface 25 also comprises a support associated with each guide wheel.

According to this second embodiment, during step 103, the end 10-1 of each rail 10 is disposed underneath the mounting interface 25 closest to the opening of the nacelle 1, the two pairs of guide wheels 28, 29 being positioned on either side of the rail 10. Then, each rail 10 is pushed into the nacelle 1 by virtue of the guidance by the wheels.

At the end of this step, the rails 10 extend in the openings of the structural elements 5 from the end 10-1 inside the nacelle 1 as far as the free end 10-2 outside the nacelle 1.

After that, the rails are fixed in position in the nacelle 1, for example using fixing means 30. In FIG. 8, the fixing means 30 comprise a rod 31 shaped to be force-fitted in an orifice 32 of a lug with which the rectilinear portion 6 of the structural element 5 is advantageously provided. The fixing means 30 are disposed behind each mounting interface 25.

Then, the H2 box is placed, as has already been explained in accordance with the first embodiment in relation to FIG. 6.

It will be noted that advantageously each rail 10 is provided with a locking pin 24 in the vicinity of the free end 10-2, as already explained for the first embodiment.

Figure 9:
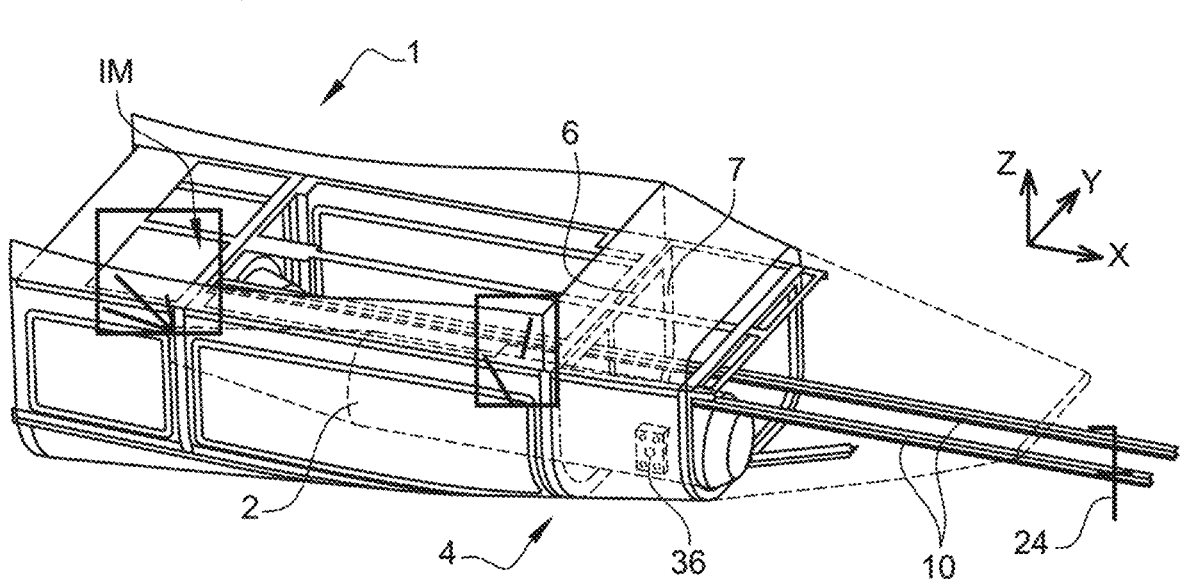
FIG. 9 is a perspective view of the nacelle in FIG. 4, according to a third embodiment of the invention, fixing means having been added to secure the H2 box in the nacelle.
Figure 10:
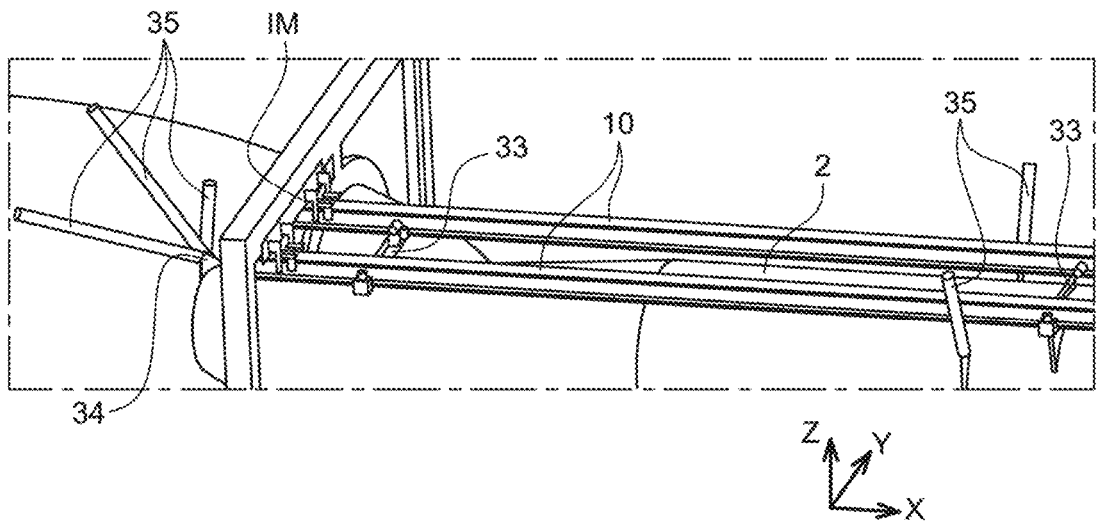
FIG. 10 is a detail view of the nacelle in FIG. 9.

According to a third embodiment, illustrated in FIGS. 9 and 10, the rails 10 are positioned as for the second embodiment, whereas the box 2 is fixed directly, for example screwed, to the rail. In FIG. 10, the box 2 is provided with bars 33 for fixing the box 2 to the rails 10.

It will be noted that advantageously each rail 10 is provided with a locking pin 24 in the vicinity of the free end 10-2, as already explained for the first embodiment.

A detailed description will now be given of the step 106 for fixing the box 2 in the installation position, in relation to FIGS. 9 and 10. As the figures show, the box 2 comprises eyelets 34 to which connection rods 35 are fixed during step 106, thereby making it possible to permanently install the box 2 in the nacelle 1. It will be noted that, although FIGS. 9 and 10 relate to the third embodiment, the fixing of the box 2 in the nacelle 1 is similar for the first and the second embodiment.

Then, during step 107, irrespective of the embodiment, the rails 10 are separated from the box 2 and/or the chassis 4, and the rails 10 are removed from the nacelle 1, in particular by taking out the interfaces IM.

It will be noted that, to position the box 2 in front of the rails 10, use can be made of a trolley for transporting the box 2. Advantageously, a permanent interface 36 of the box 2 allows the trolley to take up the box.

As the description above shows, the mounting method according to the present invention makes it possible to securely, rapidly and reliably install the H2 box in the nacelle of a hydrogen-powered aircraft.

The invention also relates to the intermediate structure, comprising the nacelle 1, the box 2 and the mounting interfaces IM, each interface being connected on one side to the chassis and on the other side to said rail, according to each of the embodiments described above.

It will be noted that the invention is not limited to the embodiments that have been described, and that these embodiments can be combined provided that they are not incompatible.

Although the implementations described above have been described and represented with reference to particular steps carried out in a particular order, it goes without saying that these steps can be combined, subdivided or re-ordered without departing from the teaching of the present disclosure. At least some of the steps can be carried out in parallel or in series. Consequently, the order and the grouping of the steps do not constitute a limitation of the present invention.

Modifications and improvements to the implementations described above of the present invention may occur to a person of ordinary skill in the art. The above description is illustrative by means of examples rather than limiting. The scope of the present invention is therefore limited solely by the scope of the claims below.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for mounting, in a nacelle for a hydrogen-powered aircraft, a box containing at least part of an equipment necessary for transporting dihydrogen to an engine of the aircraft, called H2 box, the method comprising:

positioning the H2 box in the nacelle with at least one rail secured to a chassis of the nacelle, or to the H2 box, or to both, wherein the at least one rail extends longitudinally parallel to a longitudinal axis of the nacelle between a first end, disposed in the nacelle, and a second end, disposed outside the nacelle.

2. The method according to claim 1, further comprising:

positioning the at least one rail with respect to the chassis in an installation position of the H2 box.

3. The method according to claim 2, wherein the positioning the at least one rail comprises immobilizing the at least one rail in the installation position of the H2 box.

4. The method according to claim 2, wherein the positioning the at least one rail comprises positioning a mounting interface between the chassis and the at least one rail.

5. The method according to claim 4, wherein, during the positioning the at least one rail with respect to the chassis, the at least one rail is screwed to the chassis via the mounting interface.

6. The method according to claim 4, wherein, during the positioning the at least one rail with respect to the chassis, the at least one rail is moved into the nacelle while being guided by at least one guide roller of the mounting interface.

7. The method according to claim 4, wherein the at least one rail is secured to a first structural element and a second structural element via the mounting interface.

8. The method according to claim 7, wherein the at least one rail is secured to the first structural element and the second structural element via at least four mounting interfaces.

9. The method according to claim 1, wherein the positioning the H2 box in the nacelle comprises guiding the H2 box along the at least one rail via at least one guide roller.

10. The method according to claim 1, further comprising:

securing the H2 box in the nacelle, and then, removing the at least one rail from the nacelle.

11. The method according to claim 1, further comprising:

separating the at least one rail from the chassis; and removing the at least one rail from the nacelle, such that the H2 box remains in the nacelle.

* * * * *